US006345919B1

(12) United States Patent
Chapman

(10) Patent No.: US 6,345,919 B1
(45) Date of Patent: Feb. 12, 2002

(54) CAMERA CRANE ARM WITH BALANCING SYSTEM

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 09/391,034

(22) Filed: Sep. 7, 1999

(51) Int. Cl.[7] ......................... G03B 17/00; F16M 13/00
(52) U.S. Cl. ..................... 396/428; 248/123.2; 352/243
(58) Field of Search ................................ 396/419, 428; 248/123.2, 280.11; 352/243

(56) References Cited

U.S. PATENT DOCUMENTS 1,942,925 A * 1/1934 Jenkins .................... 248/123.2
2,073,998 A 3/1937 Raby
4,621,786 A * 11/1986 Greenlee ..................... 396/13
4,657,220 A 4/1987 Lindsay
4,849,778 A * 7/1989 Samuelson .................. 396/428
5,746,404 A 5/1998 Merko

FOREIGN PATENT DOCUMENTS

| | | |
|---|---|---|
| DE | 88 09 537.1 | 12/1988 |
| GB | 2 102 757 | 2/1983 |
| NL | 9401448 | 4/1996 |

* cited by examiner

*Primary Examiner*—Russell Adams
*Assistant Examiner*—Arthur A Smith
(74) *Attorney, Agent, or Firm*—Lyon & Lyon LLP

(57) ABSTRACT

A camera crane has a spring balancing system for better maintaining the crane arm in balance as the crane arm is raised and lowered a spring link is pivotally attached to a support frame on a pivot access. Spring posts are attached to the crane arm section. Springs extend from the spring link to the spring posts. As the crane arm is raised, the springs exert a counterbalancing force. The spring balancing system can be disengaged by removing a pin extending through the spring link into the support.

22 Claims, 4 Drawing Sheets

CAMERA CRANE ARM WITH BALANCING SYSTEM

BACKGROUND OF THE INVENTION

The field of the invention is camera cranes.

Camera cranes are used in the production of motion pictures, video, and television programs. Typically, a camera crane arm or boom is pivotably mounted onto a base. A camera is mounted on a camera platform at the front end of the arm. Counterweights on a counterweight platform or bucket at the back end of the arm are added to place the arm into a balanced, or near balanced equilibrium. The base may be a mobile dolly or platform.

The length of the arm is adjusted by adding or removing crane arm segments, which are bolted and/or pinned together to form in integral arm. The camera crane arm is preferably highly rigid, when assembled, to avoid inadvertent deflections of the camera as the camera crane arm is moved. For example, if the camera crane arm is not sufficiently rigid, rapid movements of the camera crane arm (as may be necessary to film a sequence having rapid movements) may result in flexing or whipping of the arm and camera, rendering the filmed sequence unusable. However, while a highly rigid camera crane arm is desirable, at the same time, the arm should be able to be assembled into a long length, to provide an adequate range of lens height, and the arm should be light weight and preferably compact, so that it can be readily stored, shipped, assembled and maneuvered. To make the camera crane arm more rigid, tensioning cables may also be used. Typically, the cables extend from various locations along the arm, to a cable truss extending above the central section of the camera crane arm, which is pivotably mounted on the crane arm base.

While these types of camera cranes have worked well in the past, certain disadvantages remain. Due to the geometry of the camera crane arm, bending deflection of the camera crane arm when loaded, and to the shifting position of the camera crane arm and cable truss, as the arm elevation is changed, the arm cannot be uniformly balanced purely via counterweights. For example, a camera crane arm may be balanced purely with counterweights, when the arm is in the horizontal position. However, as the arm is raised to elevate the camera, the center of gravity of the cable truss shifts rearwardly, bringing the arm out of balance and making the arm back-end heavy. Consequently, to return the arm to a horizontal position requires significant upward force at the back end or weight bucket of the arm. This requires the camera crane operators to do significant lifting, and to operate the crane with a higher level of care and skill. In addition, the arm becomes unstable, so that significant braking forces are needed to hold it in position.

Accordingly, it is in object of the invention to provide an improved camera crane arm having a system for better maintaining the camera crane arm in a balanced condition.

SUMMARY OF THE INVENTION

To these ends, a camera crane includes a support frame or U-frame. A camera crane center or post section is pivotably mounted to the support frame. A spring balancing system includes a spring link also attached to the support frame. A spring post is attached to the crane arm section. At least one spring is attached to both the spring post and to the spring link. With the spring link fixed in position, upward pivoting movement of the camera crane arm, which tends to make the crane arm back-heavy also simultaneously stretches the spring. The spring exerts a counter force which tends to negate the back-heavy condition of the camera crane arm. As a result, the camera crane arm remains more uniformly balanced, not withstanding the variations in forces which occur during changes in elevation of the arm.

Preferably, the spring link can be locked into a fixed position with a quick release pin, so that the spring force exerted by the spring counteracts the other forces tending to make the crane arm back heavy. Releasing the pin allows the spring link to pivot, in response to the spring force, thereby disengaging the spring counterbalancing system.

Spring posts are advantageously provided in front and in back of the spring link. Additional counterbalancing force can be provided by attaching multiple springs onto the spring link and spring posts.

The spring balancing system may be provided on one side, or on both sides of the camera crane arm.

BRIEF DESCRIPTION OF THE DRAWINGS

In the drawings, wherein the same reference number denotes the same element, throughout each of the views.

DETAILED DESCRIPTION OF THE DRAWINGS

Figure 1:
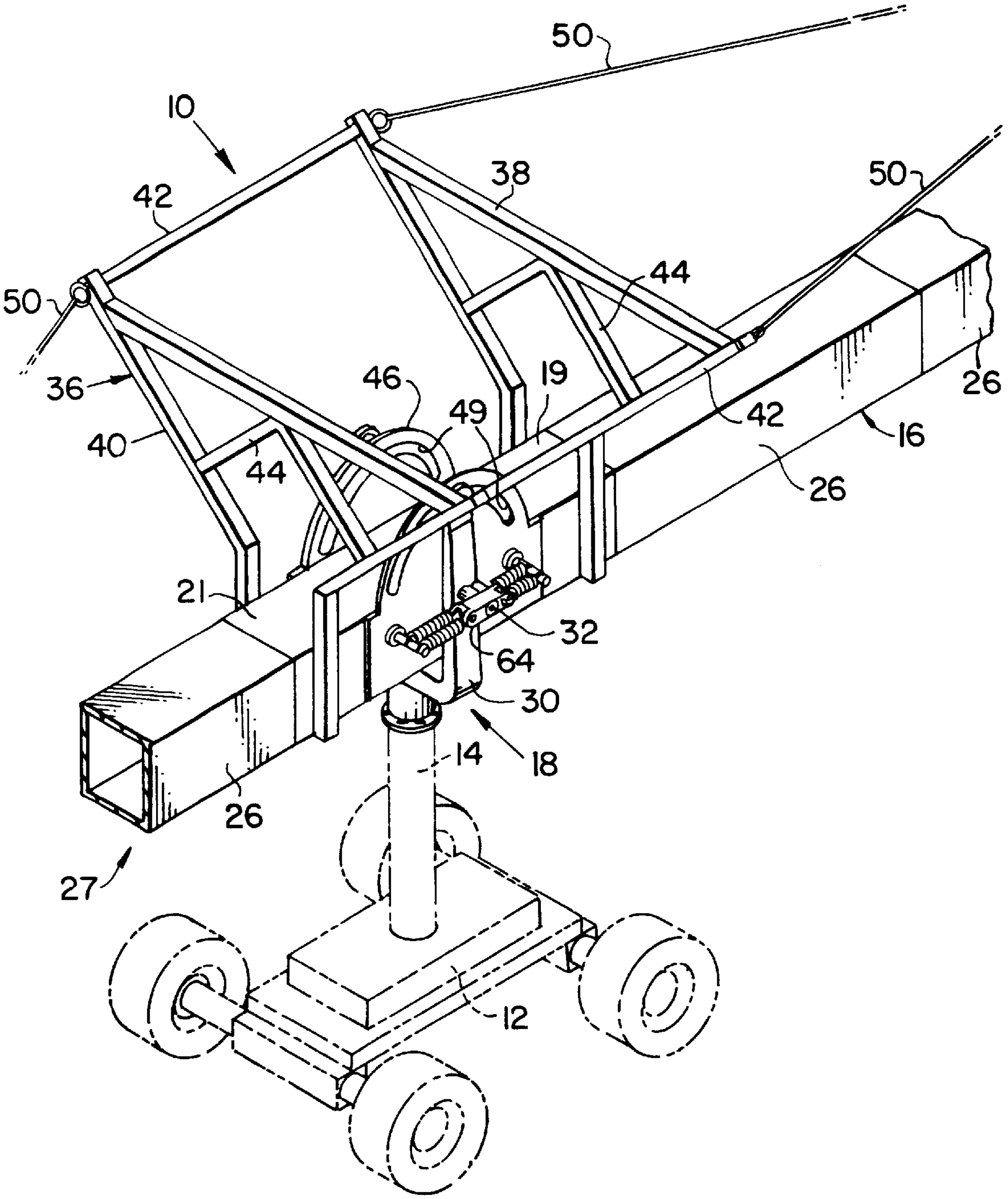
FIG. 1 is a perspective view of the present camera crane arm.

Turning now in detail to the drawings, as shown in FIG. 1, a camera crane 10 is pivotably mounted on a base post 14 extending upwardly from a mobile base 12, for example, a mobile base as described in U.S. Pat. No. 5,312,121 or 5,671,932, incorporated herein by reference.

The crane arm, or arm assembly 16, includes a post or center section 18 pivotally supported (in azimuth and elevation) on the base post 14. Typically, mid-beam sections 26 are attached to each other, and to the front end 19 and back end 21 of the post section 18, to build up the crane arm 16 to the desired length. The front end of the crane arm 16, which directly affects the available range of the camera lens height, is typically longer than the back end 27 of the crane arm 16. A camera platform is attached to a nose section at the extreme front end of the crane arm 16 and a counterweight platform or bucket is similarly attached at the back end of the crane arm 16, as shown, for example, in U.S. Pat. No. 5,781,814. A leveling system is also provided to maintain the camera platform in a level orientation, as the arm is raised or lowered, as also described in U.S. Pat. No. 5,781,814, incorporated herein by reference.

Referring to FIGS. 1–4, a support, preferably in the configuration of a U-frame 30, is pivotally attached on top of the base post 14. The post section 18 is pivotally mounted on an axle 32 supported by the support 30. The post section 18 includes a center beam 34, which preferably has a square or rectangular cross section. The center beam 34 is mounted on the axle 32 via bearings 52.

Figure 2:
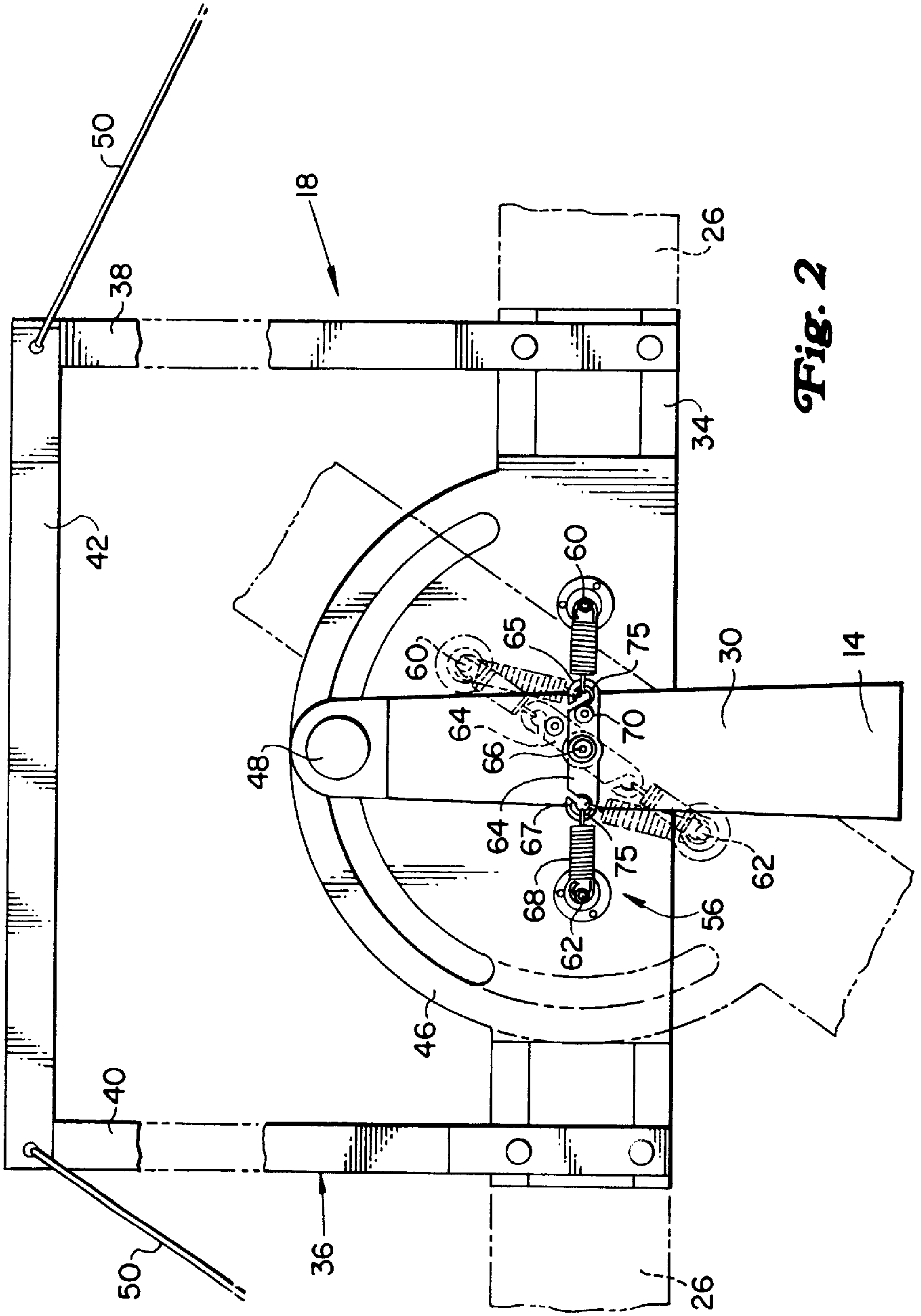
FIG. 2 is a side elevation view of the spring counterbalancing system of the invention.

Referring to FIGS. 1 and 2, a cable truss is attached to the post section 18. The cable truss 36 includes a forward truss frame 38 and a rear truss frame 40 connected by side links 42. Braces 44 are provided within the forward and rear truss frames 38 and 40, to strengthen the frames. Cables 50 extend forwardly and rearwardly from the cable truss 36, to other points along the crane arm 16, to stiffen the crane arm.

A pair of drag plates 46 extend upwardly from the center beam 34. A drag knob 48 extends through the support 30 and into an arcuate slot 49 in the drag plate 46. The drag on vertical pivoting movement of the crane arm 16 is adjusted by tightening or loosening the drag knob 48 on each side of the crane arm 16.

Figure 3:
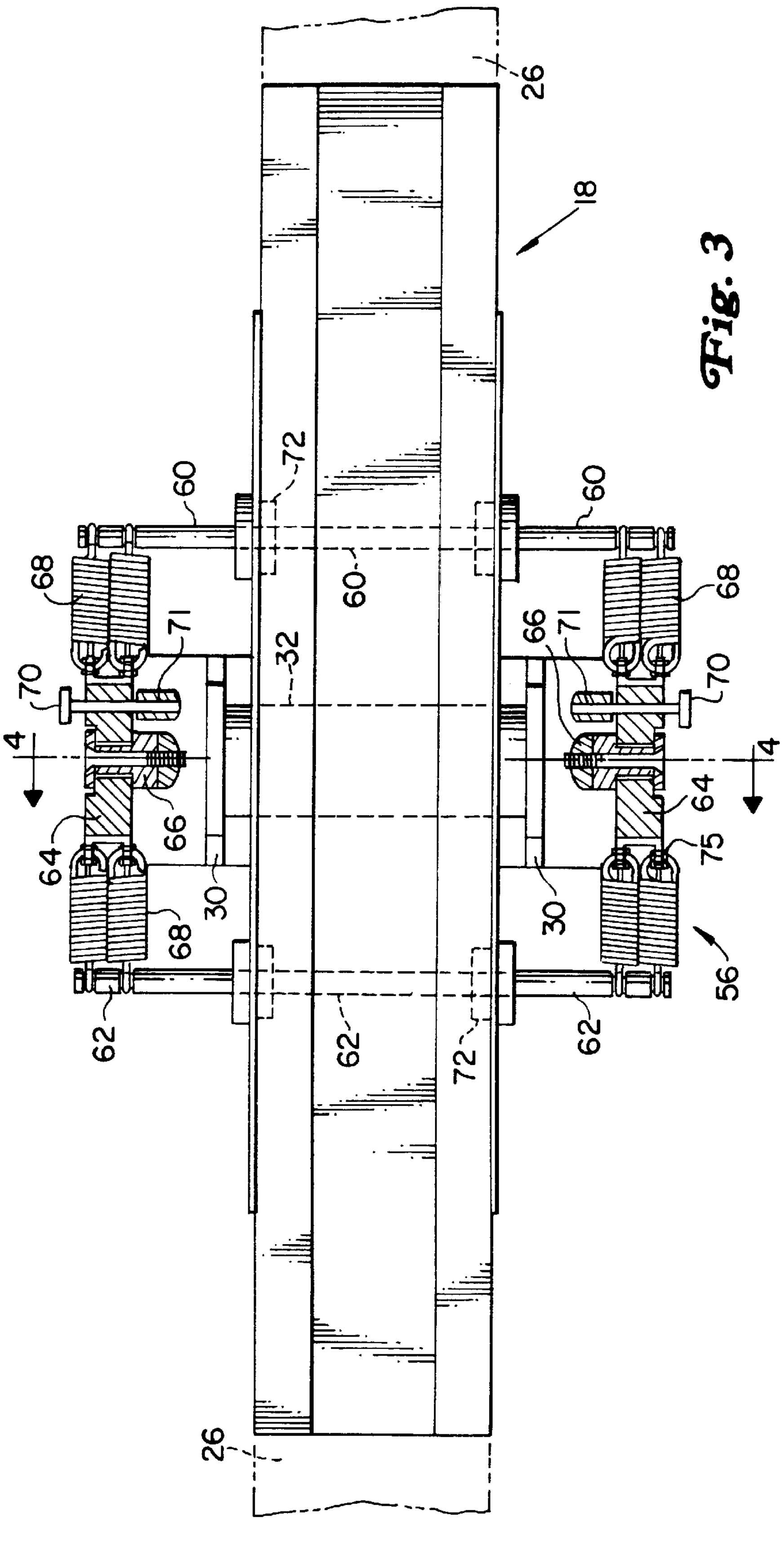
FIG. 3 is a plan view thereof.

Referring to FIGS. 2 and 3, a spring link 64 is pivotably mounted on a spring link mounting post 66 extending outwardly over the axle 32. A front spring post 60 is attached to the center beam 34 of the post section 18, in front of the spring link mounting post 66. Preferably, a rear spring post 62 is similarly attached to the center beam 34 of the post section 18, behind the spring link mounting post 66, with the front and rear spring posts 60 and 62 equally spaced apart from the spring link mounting post 66. The spring link mounting post 66 extends through the center of the spring link 64. One or more springs 68 is attached to the front spring post 60 and the front end 65 of the spring link 64, while similarly, one or more springs is also attached to the rear spring post 62 and to the back end 67 of the spring link 64.

A quick release pin 70 extends through the spring link 66 into a receiving hole 71 in the support 30, with the spring link 64 in the horizontal position shown in solid lines in FIG. 2.

In operation, as the front end 19 of the crane arm 16 is raised, the back end 21 of the crane arm 16 becomes back heavy, primarily due to the shifting weight of the cable truss 36, from a neutral or balanced position (when the arm 16 is horizontal) to an unbalanced position, with the center of gravity of the truss 36 shifted to a position behind the axle 32. Ordinarily, the arm 16 would remain back heavy, and require significant lifting force to bring the arm back into a horizontal position, or significant braking force to hold it in position. However, the spring post (60 and/or 62), spring link 64, spring link mounting post 66, and spring 68, and release pin 70, form a spring balancing system 56, which in use, largely counteracts the back heavy effect.

Specifically, referring to FIG. 2, with the pin 70 installed, the spring link 64 is locked into the horizontal position shown in solid line, and it cannot pivot. Consequently, as the arm is moved from the horizontal position, shown in solid line, to the elevated position, shown in phantom line, the springs 68 are stretched. The rear spring (connected to the rear spring post 62) is stretched in tension and produces a moment acting clockwise about the axle 32. Similarly, the front spring (connecting to the front spring post 60) exerts a counterclockwise moment about the axle 32. As a result, the moment created by the shift of the center of gravity of the cable truss 36 to a position behind the axle 32, is largely offset by the moments created by the springs 68.

Figure 4:
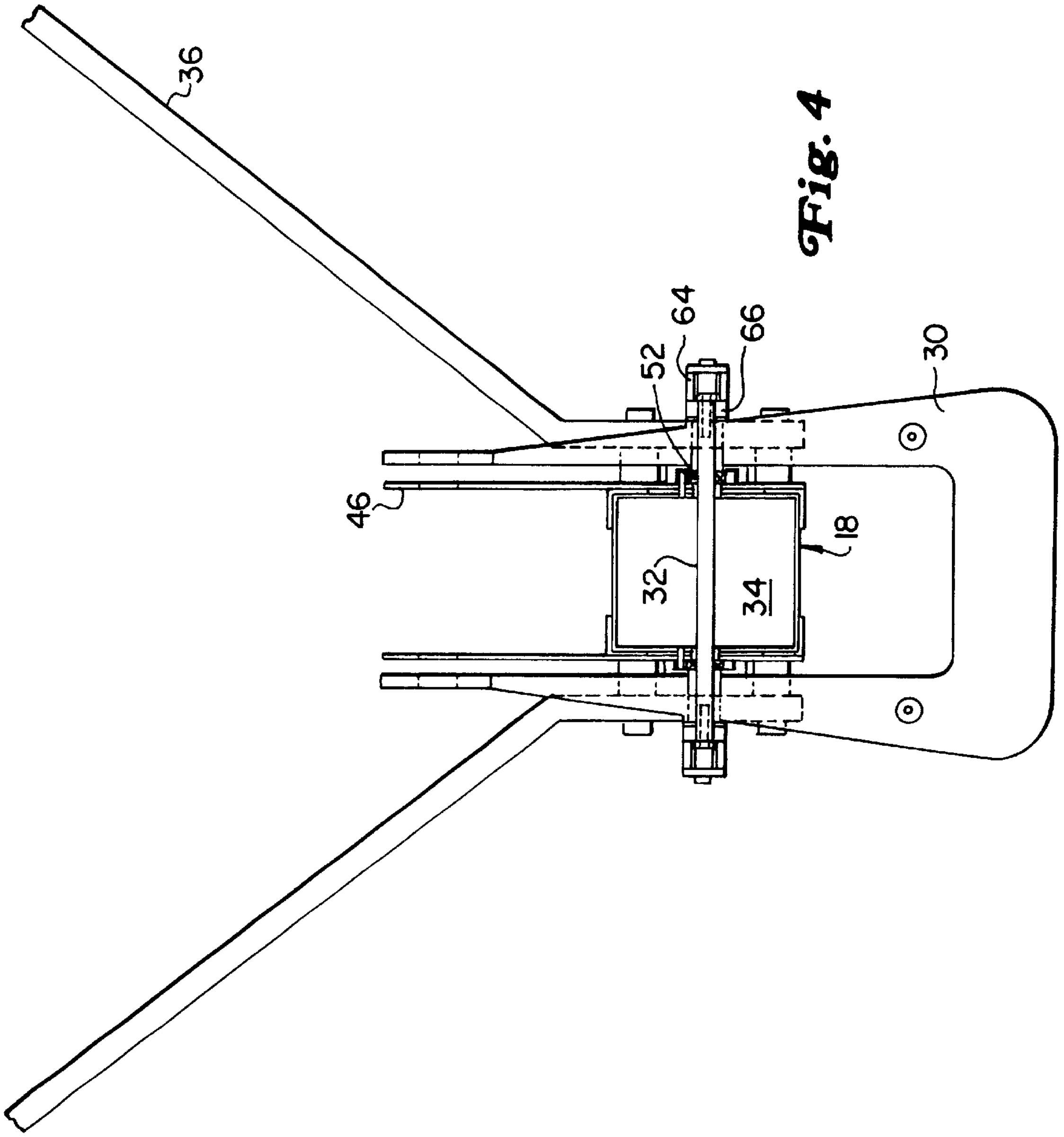
FIG. 4 is a section view thereof, taken along line-4 of FIG. 3.

The amount of offsetting force or moments can be adjusted by selecting springs having an appropriate spring constant, and/or by using multiple springs. For applications requiring only a slight counterbalancing force, only a single spring 68 may be needed, attached to either a front or rear post. However, in most applications, both front and rear springs will be preferred and multiple front and rear springs may be used. Although FIG. 2 shows the right side of the crane arm 16 and balancing system 56, a duplicate balancing system 56 is advantageously also provided on the left side, as shown in FIG. 4. While the springs 68 shown are steel springs, other rubber or elastic spring-like materials may also be used.

As shown in FIG. 3, the front and rear spring posts 60 and 62 are advantageously mounted on bearings 72, so that the posts can pivot slightly, to provide for smooth and quiet arm operation. Similarly, a friction reducing element such as a Delrin ring or bearing 75 is advantageously provided at the ends 65 and 67 of the spring link 64, to avoid slip/stick movement and noise.

To disengage the balancing system 56, the pin 70 is removed from the support 30. Then, as shown in phantom lines in FIG. 2, as the arm 16 pivots about the axle 32, the spring link 64 also pivots. As a result, the distance between the ends of the spring link and the spring posts 60 and 62 remains unchanged, the springs do not stretch and no force is exerted. Consequently, with the pin 70 withdrawn, the arm 16 operates in the conventional manner.

In some applications, the pin on one side of the arm may be engaged, while the pin on the other side of the arm is disengaged, to provide an intermediate level of counterbalancing force. The pin 70 is preferably a quick release pin, which may be captive in the spring link 64, so that it is always in position and present to be engaged into the support 30, for use of the balancing system 56.

Thus, a novel camera crane arm has been shown and described. Various modifications may of course be made without departing from the spirit and scope of the invention. Accordingly, the invention should not be limited, except by the following claims, and their equivalents.

What is claimed is:

1. A camera crane comprising:

a support frame;

a crane arm section pivotally mounted on the support frame at a pivot location;

a spring link attached to the support frame adjacent to the pivot location;

a spring post attached to the crane arm section; and at least one spring attached to the spring post and to the spring link.

2. The camera crane of claim 1 wherein the spring link is movable to a first position adjacent to the spring post and to a second position spaced apart from the spring post.

3. The camera crane of claim 2 further comprising a pin extendable through the spring link, to secure the spring link into the first position or into the second position.

4. A camera crane comprising:

a support frame;

a crane arm section pivotally mounted on an axle extending at least part way through the support frame;

a spring link pivotally attached to the support frame on a pivot axis co-linear with the axle, the spring link having a first end and a second end, the spring link lockable into at least a first position;

a first spring post and a second spring post attached to the crane arm section on opposite sides of the spring frame;

at least one first spring attached to the first spring post and to the first end of the spring link; and at least one second spring attached to the second spring post and to the second end of the spring link.

5. The camera crane of claim 4 further comprising a pin extendable through the spring link and into the support frame, for locking the spring link into one of the first position and a second position angularly offset from the first position.

6. The camera crane of claim 4 further comprising a cable truss attached to the crane arm section and with the cable truss having a center of gravity aligned with the axle.

7. The camera crane of claim 4 further comprising a bearing between at least one of the first and second spring posts and the crane arm section.

8. A camera crane comprising:

a support frame;

a crane arm section pivotally mounted on the support frame via an axle;

a spring link attached to the axle; and at least one spring attached to the crane arm and to the spring link.

9. The camera crane of claim 8 further comprising a spring post on the crane arm, with the spring attached to the spring post.

10. The camera crane of claim 8 wherein the spring link is movable between a first position adjacent to the spring post and to a second position spaced apart from the spring post.

11. A camera crane comprising:

a support frame;

a crane arm pivotally mounted on the support frame, and movable from a lowered position to a raised position;

a spring link attached to the support frame in a horizontal position;

at least one spring attached to the crane arm and to the spring link, the spring longitudinally parallel to the crane arm when the crane arm is in the lowered position;

wherein the spring link remains in the horizontal position regardless of the position of the crane.

12. The camera crane of claim 11 further comprising a spring post on the crane arm, with the spring attached to the spring post.

13. A balancing system for a camera crane comprising:

a support frame;

a crane arm pivotally mounted on the support at a pivot location;

a spring link attached to the support frame adjacent to the pivot location;

at least one spring attached to the crane arm and to the spring link.

14. The balancing system of claim 13 further comprising a spring post for attaching the spring to the crane arm.

15. The balancing system of claim 13 further comprising a pin extendable through the spring link, for locking the spring link into one of a first position and a second position angularly offset from the first position.

16. A camera crane comprising:

a support frame;

a crane arm pivotally mounted on the support frame;

a spring link attached to the support frame;

at least one spring attached to the crane arm and to the spring link;

wherein, as the crane arm is raised, the spring is stretched in tension to maintain the crane arm in balance, by exerting forces on the arm which compensate for changes in the location of the center of gravity of the arm.

17. The camera crane of claim 16 further comprising a spring post for attaching the spring to the crane arm.

18. The camera crane of claim 16 further comprising a pin extendable through the spring link and into the support frame, for locking the spring link into one of a first position and a second position.

19. The camera crane of claim 16 further comprising means for locking the spring link into at least one of a first position and a second position.

20. A camera crane comprising:

a support frame;

a crane pivotably mounted on the support frame at a pivot location;

a cable truss attached to the crane arm adjacent the pivot location; and means for maintaining the crane arm in balance, as the crane arm is raised and lowered, and the cable truss center of gravity correspondingly shifts relative to the pivot location.

21. A camera crane comprising:

a support frame;

a crane arm section pivotally mounted onto the support frame via an axle;

a spring link pivotally attached to the axle and lockable into at least a first position;

a spring post attached to the crane arm section; and at least one spring attached to the spring post and to the spring link.

22. A camera crane comprising:

a support frame;

a crane arm section pivotally mounted on the support frame at a pivot location;

a spring link attached to the support frame adjacent to the pivot location;

a spring post attached to the crane arm section;

at least one spring attached to the spring post and to the spring link;

a cable truss attached to the crane arm section adjacent to the pivot location.

* * * * *